United States Patent
Goetzer et al.

(10) Patent No.: US 8,280,034 B2
(45) Date of Patent: *Oct. 2, 2012

(54) PROVISION OF TELECOMMUNICATION SERVICES

(75) Inventors: Martin Goetzer, Backnang (DE);
Stefan Bodamer, Bad Liebenzell (DE);
Goetz Mueller, Weissach (DE)

(73) Assignee: Ericsson AB, Stockholm (SE)

( * ) Notice: Subject to any disclaimer, the term of this patent is extended or adjusted under 35 U.S.C. 154(b) by 1147 days.

This patent is subject to a terminal disclaimer.

(21) Appl. No.: 12/094,683

(22) PCT Filed: Nov. 23, 2006

(86) PCT No.: PCT/EP2006/068810
§ 371 (c)(1),
(2), (4) Date: May 22, 2008

(87) PCT Pub. No.: WO2007/060196
PCT Pub. Date: May 31, 2007

(65) Prior Publication Data
US 2008/0292090 A1 Nov. 27, 2008

(30) Foreign Application Priority Data
Nov. 25, 2005 (GB) .................................. 0524012.2

(51) Int. Cl.
*H04M 5/00* (2006.01)
(52) U.S. Cl. ........ 379/326; 379/327; 379/328; 379/329; 379/334; 379/397
(58) Field of Classification Search ................ 379/242, 379/327, 248, 325, 329, 330
See application file for complete search history.

(56) References Cited

U.S. PATENT DOCUMENTS

| 6,038,303 | A  | * | 3/2000 | Sanford et al. | 379/201.01 |
|---|---|---|---|---|---|
| 6,072,793 | A  | * | 6/2000 | Dunn et al. | 370/352 |
| 6,169,783 | B1 | * | 1/2001 | Brooks et al. | 379/9 |
| 6,337,859 | B1 | * | 1/2002 | Goldstein et al. | 370/361 |
| 6,385,299 | B1 | * | 5/2002 | Brooks et al. | 379/9 |
| 6,795,393 | B1 | * | 9/2004 | Mazzurco et al. | 370/217 |
| 6,999,408 | B1 | * | 2/2006 | Gomez | 370/217 |
| 7,281,161 | B2 | * | 10/2007 | Titmuss | 714/26 |
| 7,573,824 | B2 | * | 8/2009 | Maxwell | 370/241 |

(Continued)

FOREIGN PATENT DOCUMENTS
EP 0317852 A2 5/1989
(Continued)

*Primary Examiner* — Joseph J Nguyen
(74) *Attorney, Agent, or Firm* — Coats & Bennett, P.L.L.C.

(57) ABSTRACT

A device (500) for switching-in and switching-off telecommunications or data services in a telecommunications or data network to a plurality of subscribers the device comprising a plurality of apparatuses (100, 504, 506, 508), wherein each of which comprises a first distribution matrix (104) connected to a crossover matrix (108) and a second distribution matrix (106) connected to said crossover matrix (108), wherein the crossover matrix (108) is adapted to be connected to a main cable (110) and to a distribution cable (112) and crossover switching elements for switching of connections within said crossover matrix (108) and distribution switching elements for switching of connections within said distribution matrices (104, 106) are controlled from a remote location, wherein the first distribution matrix (104) and the second distribution matrix (106) are adapted to be connected to a node for providing plurality of telecommunications or data services (114) and wherein the first distribution matrix (104) from a first apparatus (100) is connected (512) to at least one second distribution matrix of the plurality of apparatuses (100, 504, 506, 508).

33 Claims, 10 Drawing Sheets

U.S. PATENT DOCUMENTS

| | | |
|---|---|---|
| 2002/0101972 A1 | 8/2002 | Teixeira |
| 2004/0005049 A1* | 1/2004 | Bain et al. ............... 379/387.01 |
| 2004/0137897 A1 | 7/2004 | Teixeira |

FOREIGN PATENT DOCUMENTS

| | | |
|---|---|---|
| EP | 1175078 A2 | 1/2002 |
| EP | 1626563 A1 | 2/2006 |
| GB | 1404780 A | 9/1975 |
| JP | 06339161 A | 12/1994 |
| WO | 01/20922 | 3/2001 |
| WO | 0145452 A2 | 6/2001 |
| WO | 0160042 A1 | 8/2001 |
| WO | 2005071979 A1 | 8/2005 |
| WO | 2005091613 A1 | 9/2005 |
| WO | 2006/063951 | 6/2006 |
| WO | 2006122699 A1 | 11/2006 |

* cited by examiner

○ inactive coil
● active coil

*FIG. 14b*

○ inactive coil
● active coil

PROVISION OF TELECOMMUNICATION SERVICES

FIELD OF THE INVENTION

The present invention relates in general to an apparatus and a method for providing telecommunications services to users and in particular to an apparatus and a method of switching-in new connections and switching-out obsolete connections.

BACKGROUND OF THE INVENTION

Current telecommunications networks can supply a variety of telecommunications services to customers via a Multi-Service Access Node (MSAN). Such a MSAN can provide services such as Plain Old Telephone Services (POTS), Digital Subscriber Lines (DSL) or Integrated Services Digital Network (ISDN) lines. These services are supplied via customer subscriber lines which are typically copper cables connected to a customer Main Distribution Frame (MDF), The customer MDF is usually located in a service box in the street near to the customer's premises. The MSAN is connected to a provider MDF which is also located in the service box. To supply a particular telecommunications service to a customer the service provider must make connections between the customer MDF and the provider MDF. Such connections are typically made manually by a service engineer who must visit the service box and make the connections. New connections are required to be made each time a new service is provided to a customer or an existing service is changed. The problem is to manage physical copper wiring connections between services available to the customers and big number of customers. The problem is even more acute when, as indicated above, new customer must be added or new service, or when old customer wants to change his service package or to terminate one or more. All these require visit of the field engineer at the service box. Having regard to the huge number of such service boxes deployed in the field servicing of them and maintaining high responsiveness to customers' requests is expensive and time consuming task.

The cost of making the connections has two main components. The first is the fixed cost of providing the equipment to make the connection. The second is the overhead cost associated with the requirement for the service engineer to visit the service box and make the connection. Service providers aim to minimise both of these costs.

The overhead cost can be reduced by waiting until there are several connections to be made at the service box at the same time. This has the drawback that a customer may have to wait for the service to be connected. Alternatively service providers can minimise the overhead cost by including a cross connect between the customer MDF and the provider MDF which allows automated connects to be made from a remote location. The known cross connects used for such automated provisioning are either a cross bar or a Clos network. Whereas a cross bar is non-blocking a Clos network can be either blocking, non-blocking or non-blocking after reconfiguration.

One problem associated with the cross bar and the Clos network is the initial cost of purchase which increasing the fixed costs. This is particularly the case with a cross bar which becomes increasingly expensive as the number of cross bars increases due to the square relationship between the number of cross bars and the number of cross points. A further problem associated with the cross bar and the Clos network is the waste of resources due to the over provisioning of full non-blocking functionality. Typically about 5-10% of customer connections are changed per year, which means that 90-95% of connections remain unchanged. The provision of full non-blocking functionality therefore represents a waste of resources, which increases the fixed costs for providing new services to customers.

Another solution known in the art is the one defined in US patent application US2002/0101972A1. However apparatus and method as in the invention now to be described are neither disclosed nor suggested in the prior art document.

Hence, an improved apparatus and method of switching-in new connections and switching-out obsolete connections would be advantageous and in particular one that allows for performing the operations without or with significantly reduced the need for service engineer making the connections in the service box deployed in the field.

SUMMARY OF THE INVENTION

Accordingly, the invention seeks to preferably mitigate, alleviate or eliminate one or more of the disadvantages mentioned above singly or in any combination.

According to a first aspect of the present invention there is provided a device for switching-in and switching-off telecommunications or data services in a telecommunications or data network to a plurality of subscribers the device comprising a plurality of apparatuses, wherein each of which comprises a first distribution matrix connected to a crossover matrix and a second distribution matrix connected to said crossover matrix, wherein the crossover matrix is adapted to be connected to a main cable and to a distribution cable and crossover switching elements for switching of connections within said crossover matrix and distribution switching elements for switching of connections within said distribution matrices are controlled from a remote location, wherein the first distribution matrix and the second distribution matrix are adapted to be connected to a node for providing plurality of telecommunications or data services and wherein the first distribution matrix from a first apparatus is connected to at least one second distribution matrix of the plurality of apparatuses.

According to a second aspect of the present invention there is provided a telecommunications or data network including a node for providing a plurality of telecommunications or data services to a plurality of subscribers, a device for switching-in and switching-off telecommunications to said plurality of subscribers the device comprising plurality of apparatuses wherein each of which comprises a first distribution matrix connected to a crossover matrix and a second distribution matrix connected to said crossover matrix, wherein the crossover matrix is adapted to be connected to a main cable and to a distribution cable and crossover switching elements for switching of connections within said crossover matrix and distribution switching elements for switching of connections within said distribution matrices are controlled from a remote location, wherein the first distribution matrix and the second distribution matrix are adapted to be connected to a node for providing plurality of telecommunications or data services and wherein the first distribution matrix from a first apparatus is connected to at least one second distribution matrix of the plurality of apparatuses.

According to a third aspect of the present invention there is provided a method of operating a telecommunications or data network in which services are provided from a node for supplying a plurality of telecommunications or data services to a plurality of users, wherein a plurality of subscriber lines are connected to the network through a crossover matrix and on request to add or modify a service to a subscriber line a crossover switching element of the crossover matrix, the crossover switching element being associated with said subscriber line, switches electrically the subscriber line on subscriber cable side of the crossover matrix to a second distribution matrix and on main cable side of the crossover matrix to a first distribution matrix, the distribution matrices switch the subscriber line to appropriate outputs of the distribution matrices, wherein the crossover switching elements in crossover matrix and distribution switching elements in distribution matrices are controlled from a remote location.

According to a fourth aspect of the present invention there is provided a method of operating a telecommunications or data network in which services are provided from a node for supplying a plurality of telecommunications or data services to a plurality of users, wherein a plurality of subscriber lines are connected to the network through a crossover matrix the method comprising switching a subscriber line connected to a first crossover switching element of the crossover matrix to a second distribution matrix, wherein the second distribution matrix switches the subscriber line to an output port directly connected with the first distribution matrix and the first distribution matrix switches the subscriber line to a second crossover switching element of the crossover matrix which, in turn, switches the subscriber line again to the second distribution matrix and the second distribution matrix switches the subscriber line to an output connected to said node for supplying services.

Further features of the present inventions are as claimed in the dependent claims.

The present invention beneficially allows for building switching apparatus for use in street cabinets that have reduced overall blocking probability due to recursive matrix cycles, and which require significantly less amount of basic switching elements. Even if the primary port of the distribution stage is blocked (i.e. there is no more free ports available for a certain input after a specific number of input-output assignments) there will still be side outputs available that can be re-routed to another port that in turn allows routing to a free port. The idea of building up a larger matrix of small repetitive arrangements of simple 2×2 elements, which require only a very simple configuration, reduced the control effort and resources required for operating the apparatus according to the present invention. As the solution according to the present invention allows for stacking of several switching apparatuses the use of the invention is very flexible and provides option for scalability. Additional benefit is that the apparatus allows for carrying tests of the lines in the distribution cable and in the main cable.

BRIEF DESCRIPTION OF THE DRAWINGS

The present invention will be understood and appreciated more fully from the following detailed description taken in conjunction with the drawings in which.

DESCRIPTION OF AN EMBODIMENT OF THE INVENTION

The following description focuses on an embodiment of the invention applicable to telecommunications networks. However, it will be appreciated that the invention is not limited to this application but may be applied to other types of networks (e.g. data networks).

The term "main cable" also referred to as "central office cable" herein below refers to a cable that connects the device in question to the central office or to the network management (in short, cable on the network side).

The term "distribution cable" also referred to as "subscriber cable" herein below refers to a cable that provides connections to subscriber devices.

Figure 1:
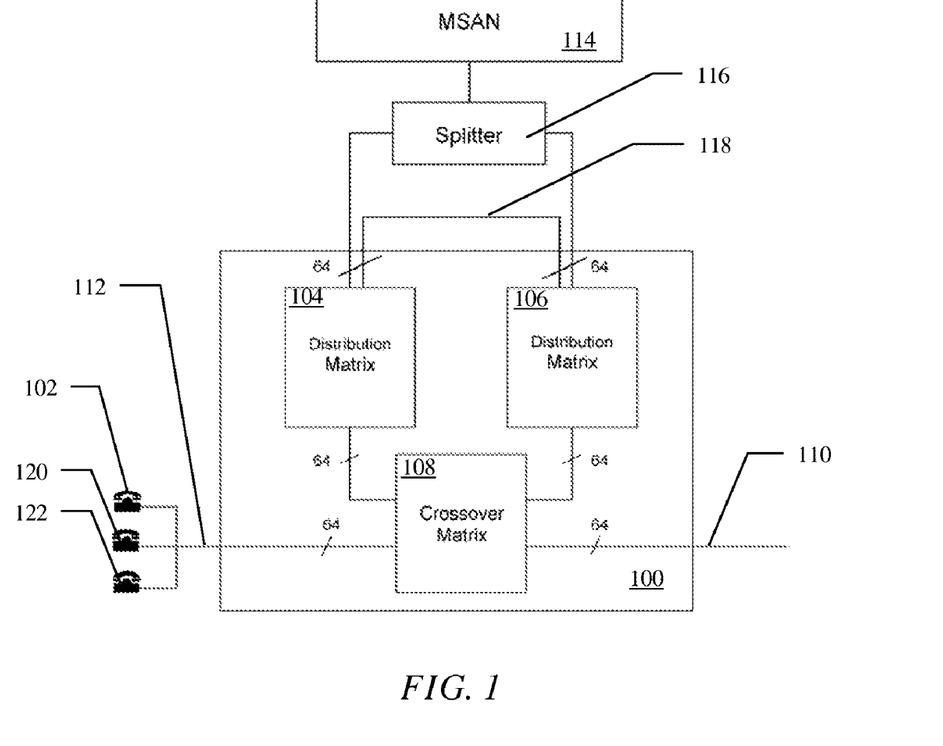
FIG. 1 is a block diagram illustrating an apparatus for switching-in and switching-off telecommunications or data services in a telecommunications or data network in accordance with one embodiment of the present invention.

With reference to FIG. 1 an apparatus 100 for switching-in and switching-off telecommunications or data services in a telecommunications or data network to a plurality of subscribers is presented. For the sake of clarity the drawings present the invention in a very schematic way with elements and lines not essential for understanding the invention omitted.

The network includes a Multi-Service Access Node (MSAN) 114 which can provide different telecommunications services to subscribers 102, 120, 122 connected to a distribution cable 112. In the upstream direction the MSAN 114 is in communication with a wider telecommunications network (not shown).

The apparatus comprises a first distribution matrix 104 connected to a crossover matrix 108 and a second distribution matrix 106 connected to said crossover matrix 108. The crossover matrix 108 is connected on its one side to a main cable 110 and on the opposite side to a distribution cable 112. Switching elements (i.e. crossover switching element 202 and distribution switching element 302) for switching of connections within said crossover matrix 108 and distribution matrices 104, 106 are controlled from a remote location. These switching elements are responsible for establishing an electrical connection throughout the crossover matrix 108 and distribution matrices 104, 106. The first distribution matrix 104 and the second distribution matrix 106 are connected to a Multi-Service Access Node, MSAN 114.

In one embodiment the first distribution matrix 104 and the second distribution matrix 106 are directly connected by an external loop 118. This external loop allows for direct connections from one distribution matrix to another one.

Figure 2:
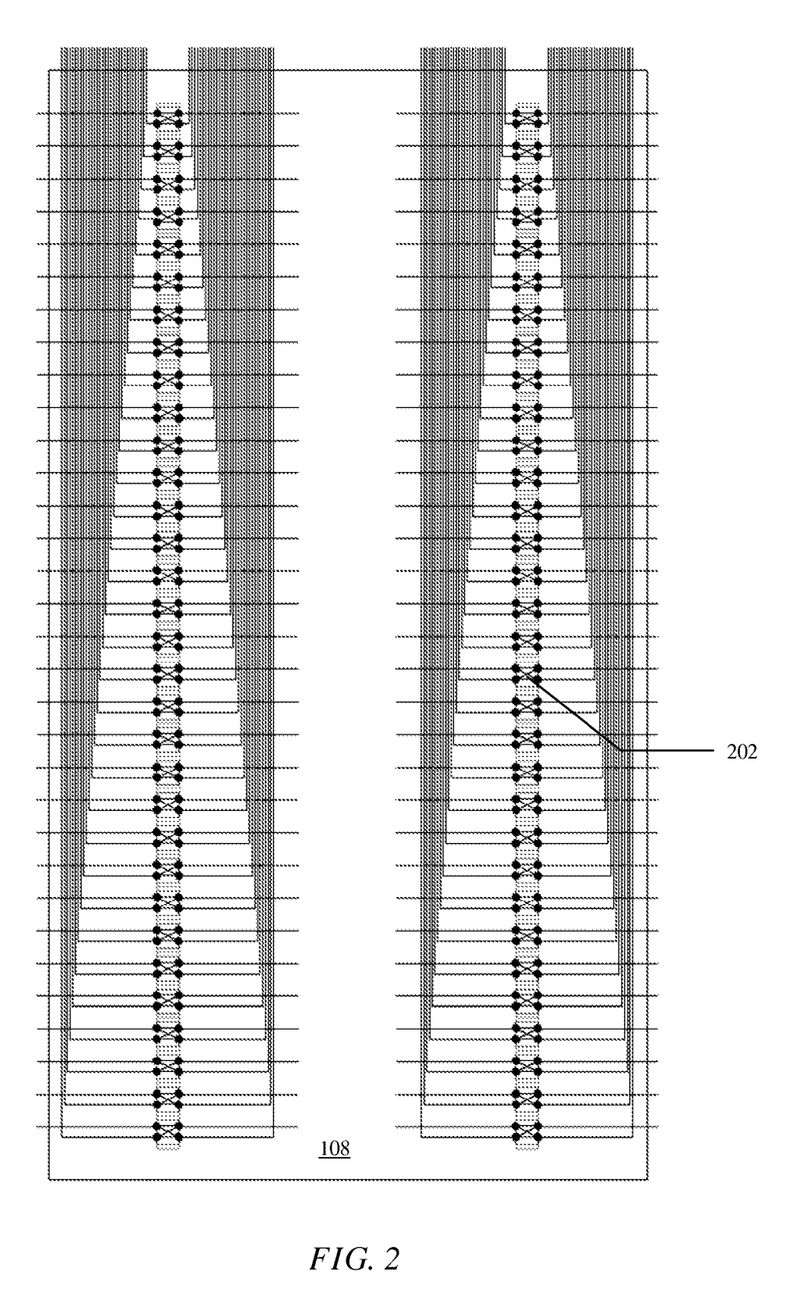
FIG. 2 is a diagram illustrating arrangement of crossover switching elements in a crossover matrix in accordance with one embodiment of the present invention.
Figure 4:
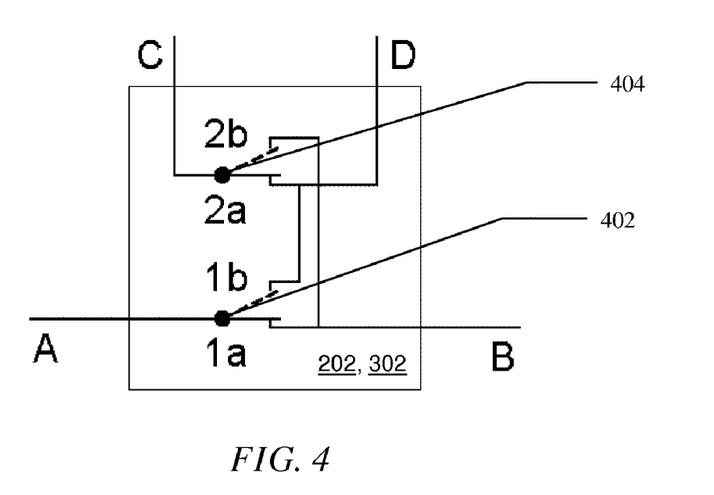
FIG. 4 is a schematic diagram illustrating a switching element used in devices in accordance with one embodiment of the present invention.

With reference to FIG. 2 the crossover matrix 108 is presented. The crossover matrix 108 comprises a plurality of 2×2 crossover switching elements 202. The 2×2 notation relates to 4 ports of the crossover switching element. The crossover switching element is presented in FIG. 4 and it consists of four ports (A-D) and two relays 402 and 404. The switches allow for connection of port A to port B and connection of port C to port D (this is so called passthrough connection-relays 402 and 404 in positions 1a and 2a respectively). Alternatively the switches allow for connecting port A to port D and connecting port B to port C (this is so called crossover connection-relays 402 and 404 in positions 1b and 2b respectively). Because the relays 402 and 404 in the crossover switching element are operated independently there is yet another alternative configuration in which port A is connected to ports C and D and port B is isolated (relays 402 and 404 in positions 1b and 2a respectively). In configuration when relays 402 and 404 are in positions 1a and 2b ports C, A and B are connected and port D is isolated.

Because one line consists of two twisted copper wires said one line requires two switching elements to correctly switch the line between ports, but for the sake of clarity only one switching element per line is presented in the figures.

In the example shown in FIG. 2 there are 64 separate crossover switching elements that serve 64 subscriber lines. The function of the crossover switching element 202 is to connect the subscriber 102 connected to port A directly to port B to which the main cable 110 is connected or to connect said subscriber 102 line connected to port A to port D, which in turn is connected to the second distribution matrix 106 and at the same time to connect the main cable connected to port B to port C, which in turn is connected to the first distribution matrix 104. By isolating port B it is possible to carry out testing of the subscriber line, which is described below.

Figure 3:
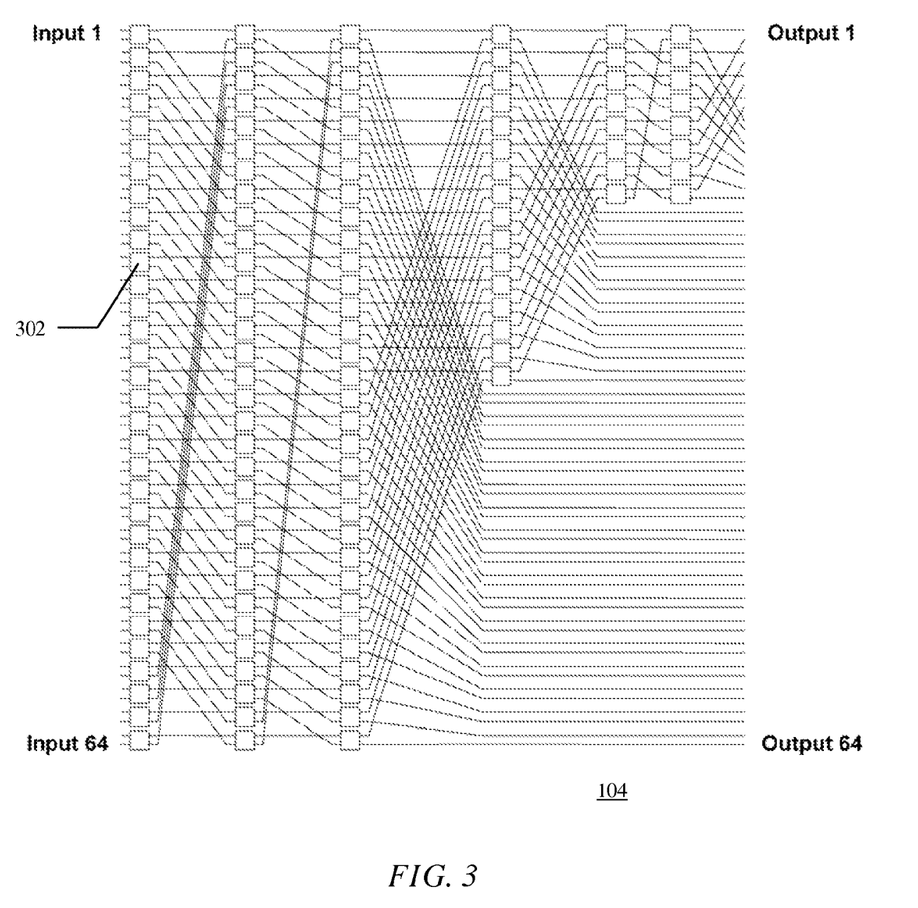
FIG. 3 is a diagram illustrating arrangement of distribution switching elements in a distribution matrix in accordance with one embodiment of the present invention.

With reference to FIG. 3 one implementation of a distribution matrix is shown. In the illustrated example the distribution matrix has 64 inputs and 64 outputs. Switching within the matrix 104 is carried out by a plurality of 2×2 distribution switching elements 302 arranged in banks and interconnected as illustrated in FIG. 3, wherein FIG. 3 provides enough information for one skilled in the art to implement the distribution matrix in practice.

The 2×2 distribution switching elements 302 are substantially the same known type as the crossover switching element 202 with the difference that the distribution switching element 302 used in the distribution matrices 104 and 106 has its relays 402 and 404 operated together, which means that it can only establish passthrough and crossover connections, the other, less important difference, difference is that in crossover switching elements ports C and D are in upright position and in distribution switching element ports C and D are parallel to ports A and B.

The arrangement of the distribution switching elements 302 shown in FIG. 3 allows switching of line connected to any one input to the following number of outputs (numbers given below are valid for unconfigured distribution matrix):

each of the 64 inputs can reach 24 outputs, the first 16 outputs (outputs 1-16) can be reached by all 64 inputs, the second 16 outputs (outputs 17-32) can be reached by 16 different inputs the remaining 32 outputs (outputs 33-64) can be reached by 8 different inputs.

In consequence of this arrangement of the distribution switching elements 302 the distribution matrix 104, 106 is unsymmetrical, which refers to reachability of output ports by input ports on one hand (e.g. the outputs 1-16 can be reached by all 64 inputs) and the reduced number of distribution switching elements stages on the other hand (the number of distribution switching elements stages for input 64 is half of that for input 1). The less worthy outputs (i.e. outputs 33-64) are the ones that in some embodiments can be looped back (i.e. connected directly to the other distribution matrix).

If the apparatus 100 is considered as a blackbox a line connected to a port on one cable side (i.e. connected to one side of the crossover matrix) can reach one specific port on the opposite cable side or 24 output ports in the distribution matrix.

This allows for high flexibility in connecting services. It must be noted that at least some of the outputs are connected to the MSAN (i.e. the node that provides various services).

In alternative embodiment, for further flexibility the distribution matrix has assigned at least one output to be directly connected 118 to one output of another distribution matrix (e.g. in FIG. 1 the first distribution matrix 104 is connected by means of connection 118 to the second distribution matrix 106). However it is within contemplation of the present invention that the number of direct connections 118 between the first and second distribution matrices can be higher than 1.

In one embodiment the first and second distribution matrices 104, 106 of the apparatus 100 are connected to the MSAN 114 via a splitter 116. The splitter 116 is a passive component that separates/combines low frequency (POTS or ISDN) and high frequency (xDSL) parts of the signal. The MSAN provides a high frequency signal (xDSL) and main cable provides low frequency signal (POTS, ISDN) which are combined in the splitter 116 and provided to the subscriber 102 via the distribution cable. At the subscriber location exists a similar device, which separates the signal parts to the telephone and the xDSL modem (which is often referred to as xDSL filter or broadband filter).

A great advantage of the present invention is that the apparatus 100 can be stacked with a plurality of similar apparatuses to form a device 500 for switching-in and switching-off telecommunications or data services in a telecommunications or data network to a plurality of subscribers. The device 500 comprises a plurality of apparatuses 100, 504, 506, 508 as the apparatus 100 defined above. A first distribution matrix 104 from a first apparatus 100 is connected 512 to at least one second distribution matrix of the plurality of apparatuses 100, 504, 506, 508. In the embodiment illustrated in FIG. 5 the first distribution matrix 104 is connected to four second distribution matrices (some not shown) of the four apparatuses 100, 504, 506, 508.

Figure 5:
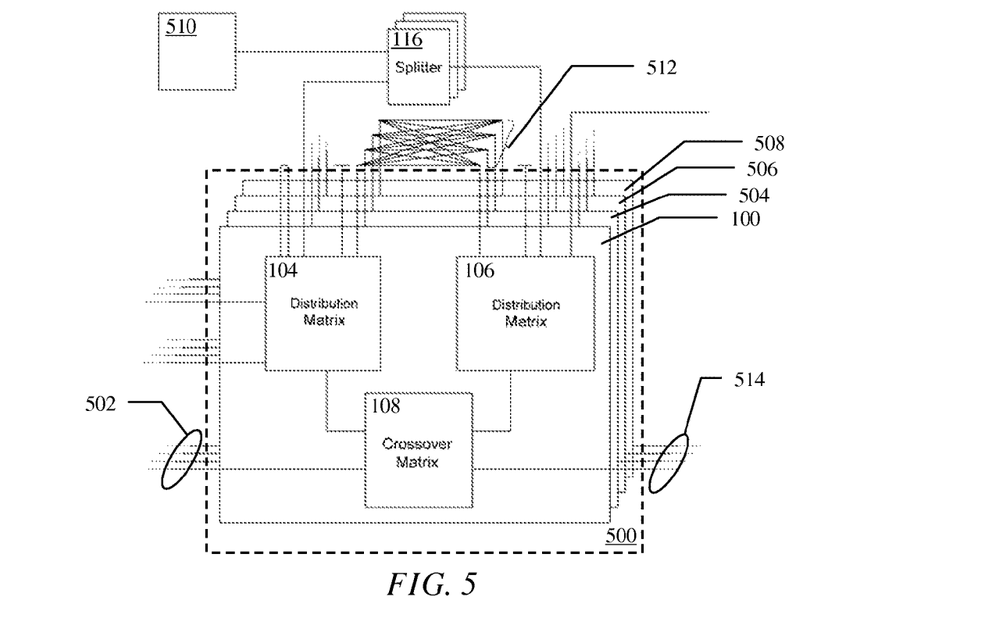
FIG. 5 is a block diagram illustrating an apparatus for switching-in and switching-off telecommunications or data services in a telecommunications or data network in accordance with one embodiment of the present invention.

By means of stacking it is possible to increase the number of lines 502 in the subscriber cable and the number of lines 514 in the main cable.

Figure 15:
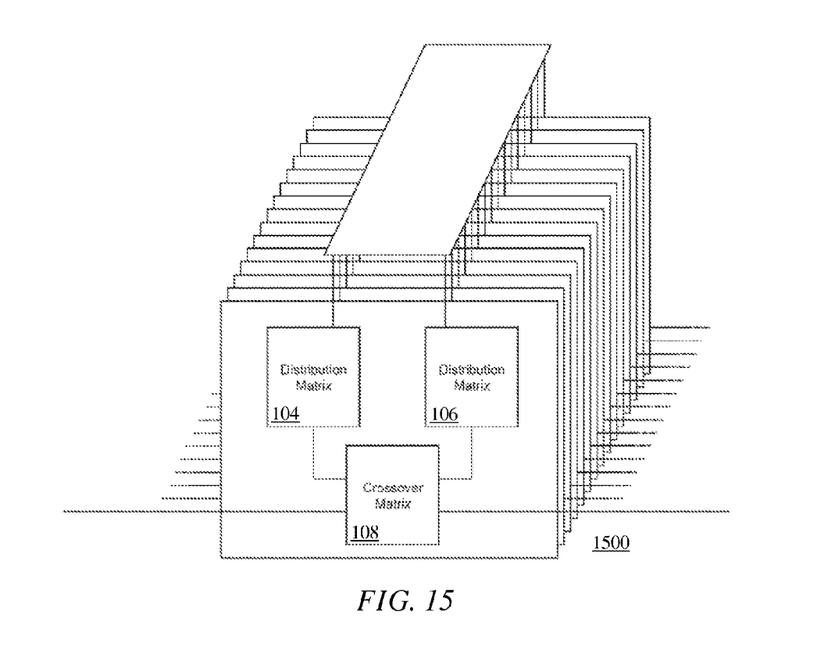
FIG. 15 is a block diagram illustrating operation of an apparatus for switching-in and switching-off telecommunications or data services in a telecommunications or data network in accordance with one embodiment of the present invention.

An alternative embodiment of illustrating stacking of the apparatuses is presented in FIG. 15. In this specific embodiment the device 1500 consists of plurality of apparatuses similar to apparatus 100 with all their output ports of the distribution matrices interconnected. In this embodiment all the output ports of the first distribution matrix 104 are connected to a plurality of second distribution matrices of the apparatuses forming device 1500. Similarly other first distribution matrices (i.e. distribution matrices on the left hand side of the FIG. 15) from remaining apparatuses are connected to said plurality of second distribution matrices of the apparatuses forming device 1500. This embodiment is particularly useful for use in various central office applications e.g. for bulk re-arrangements of connections.

A telecommunications or data network comprises a node 114, 510 (in one embodiment it is MSAN) for providing a plurality of telecommunications or data services to a plurality of subscribers 102, 120, 122, an apparatus 100 for switching-in and switching-off telecommunications or data services to said plurality of subscribers. The apparatus 100 comprises a first distribution matrix 104 connected to a crossover matrix 108 and a second distribution matrix 106 connected to said crossover matrix 108. The crossover matrix 108 is adapted to be connected to a main cable 110 and to a distribution cable 112 whereas switching of connections within said crossover matrix 108 and distribution matrices 104, 106 is controlled from a remote location. The first distribution matrix 104 and the second distribution matrix 106 are connected to said node 114, 510 for providing a plurality of telecommunications services.

Internal structure and connections between the crossover matrix and distribution matrices in the embodiment of the network are as defined above for the apparatus 100.

In another embodiment a telecommunications or data network includes a node 114, 510 for providing a plurality of telecommunications or data services (in one embodiment it is MSAN) to a plurality of subscribers 102, 120 122, a device 500 for switching-in and switching-off telecommunications to said plurality of subscribers. The device 500 comprises a plurality of apparatuses 100, 504, 506, 508 as the apparatus 100 defined above. A first distribution matrix 104 from a first apparatus 100 is connected 512 to at least one second distribution matrix of the plurality of apparatuses 100, 504, 506, 508. In the embodiment illustrated in FIG. 5 the first distribution matrix 104 is connected to four second distribution matrices (some not shown) of the four apparatuses 100, 504, 506, 508.

Figure 6:
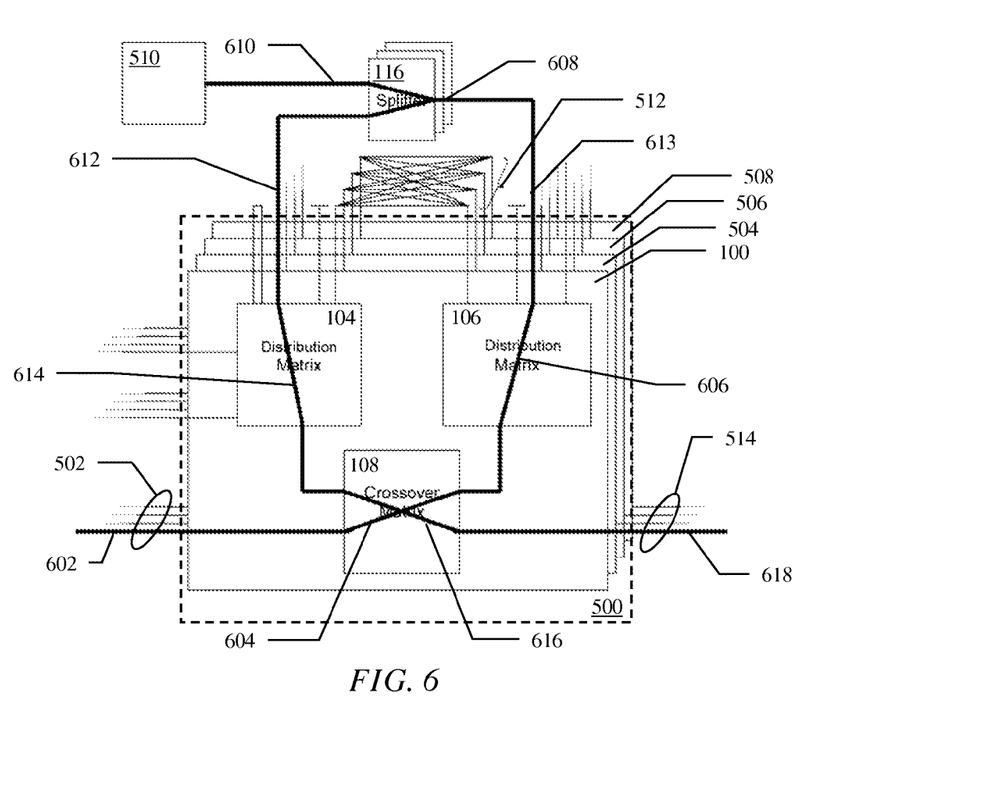
FIG. 6 is a block diagram illustrating operation of an apparatus for switching-in and switching-off telecommunications or data services in a telecommunications or data network in accordance with one embodiment of the present invention.

With reference to FIG. 6 a method of operating a telecommunications network in which services are provided from a node 510 for supplying a plurality of telecommunications services to a plurality of users. A plurality of subscriber lines are connected to the network through a crossover matrix 108 and on request to add a service to one subscriber line 602 a crossover switching element of the crossover matrix 108, the crossover switching element being associated with said one subscriber line 602, switches 604 electrically the subscriber line 602 on subscriber cable side of the crossover matrix 108 to 606 a second distribution matrix 106. Similarly on the main cable side the crossover matrix 108 switches electrically 616 the corresponding line 618 of the main cable to 614 a first distribution matrix 104. The distribution matrices 104, 106 switch the subscriber line through series of distribution switching elements to outputs associated with the requested services 612, 613 and said outputs are connected 608, 610 to said node 510 for supplying services via a splitter 116. Said node provides the requested service to said subscriber line whereas the high frequency signal (e.g. xDSL) from said node 510 and a low frequency signal (POTS, ISDN) from a main cable are combined in the splitter 116 and provided to the subscriber 102 via the distribution cable. The crossover switching elements 202 in crossover 108 and distribution switching elements 302 in distribution matrices 104, 106 are controlled from a remote location.

In alternative embodiment if a change of a service is requested the distribution matrices 104, 106 switch the subscriber line from the output associated with the present service to an output associated with the requested service.

Figure 16:
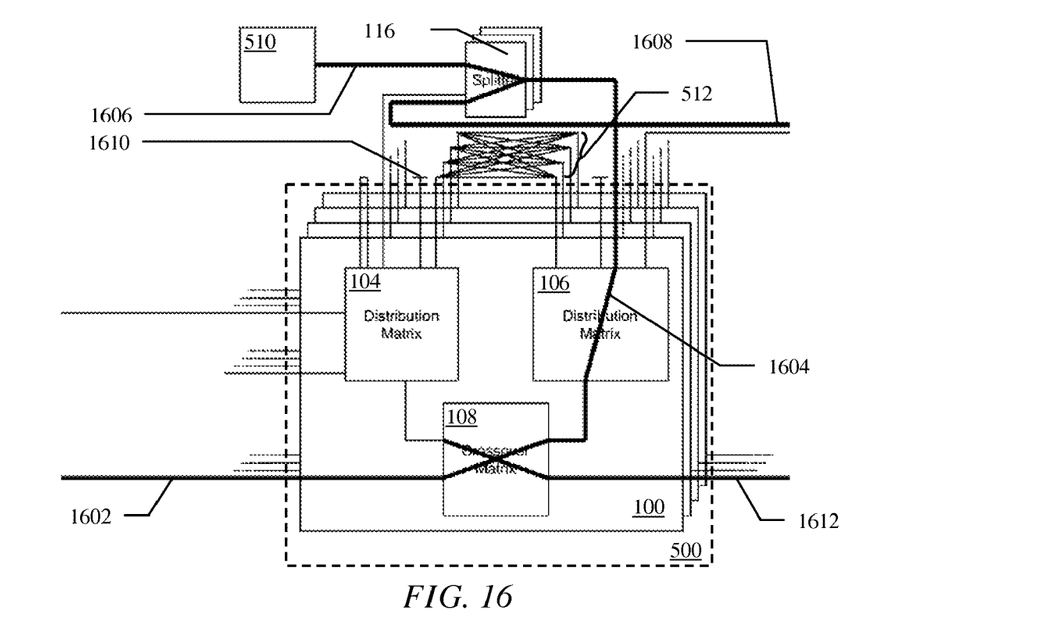
FIG. 16 is a block diagram illustrating operation of an apparatus for switching-in and switching-off telecommunications or data services in a telecommunications or data network in accordance with one embodiment of the present invention.

In yet another embodiment of the method of operating a telecommunications network, as illustrated in FIG. 16, on request to add a service to one subscriber line 1602 a crossover switching element of the crossover matrix 108, the crossover switching element being associated with said one subscriber line 1602, switches electrically the subscriber line 1602 on subscriber cable side of the crossover matrix 108 to the second distribution matrix 106. Similarly on the main cable side the crossover matrix 108 switches electrically the corresponding line of the main cable to the first distribution matrix 104 where the connection of line is terminated (e.g. it can be switched to one of the unassigned outputs 1610. The subscriber line 1604 is switched through the second distribution matrix 106 to an output connected to the node 510 via the splitter 116. Said node 510 provides 1606 the requested service to said subscriber line, wherein the subscriber line is connected in said splitter 116 to a line from the main cable 1608, wherein the main cable line 1608 is connected directly to the splitter. The purpose of the application in FIG. 16 is local loop unbundling, i.e. a subscriber initially connected to an incumbent provider owning the lower main cable 1612 is switched to an alternative provider and its equipment sitting behind main cable 1608.

It will be appreciated that whilst only three subscribers are shown and that in the presented embodiments the matrices have 64 inputs/outputs, the invention is scalable to provide many more subscriber lines and similarly other number of inputs/outputs can be implemented.

Figure 7:
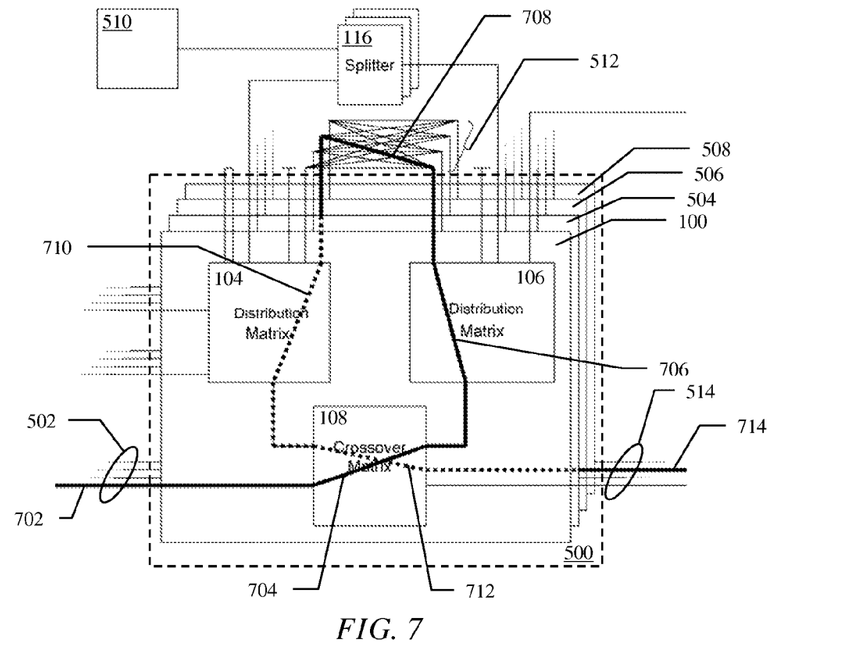
FIG. 7 is a block diagram illustrating operation of an apparatus for switching-in and switching-off telecommunications or data services in a telecommunications or data network in accordance with one embodiment of the present invention.

With reference to FIG. 7 a change of the line in the main cable is illustrated. If a change of the line in the main cable to which a subscriber line 702 is connected is requested, a first crossover switching element in a crossover matrix 108 switches 704 the subscriber line 702 to the second distribution matrix 106. The second distribution matrix 106 switches 706 the subscriber line directly via 708 one of external loops 512 to a first distribution matrix and said first distribution matrix switches 710 the subscriber line to a second crossover switching element of a crossover matrix, which, in turn, switches 712 it to another line in the main cable 714.

In one embodiment of the method of changing the line in the main cable the first crossover switching element and the second distribution matrix form a part of a first apparatus 100 and the second crossover switching element and the first distribution matrix form a part of a second apparatus 506 for switching-in and switching-off telecommunications services to a plurality of subscribers.

In alternative embodiment of the method of changing the line in the main cable the first crossover switching element, the second distribution matrix, the second crossover switching element and the first distribution matrix form a part of a the same apparatus 100 for switching-in and switching-off telecommunications services to a plurality of subscribers.

Figure 17:
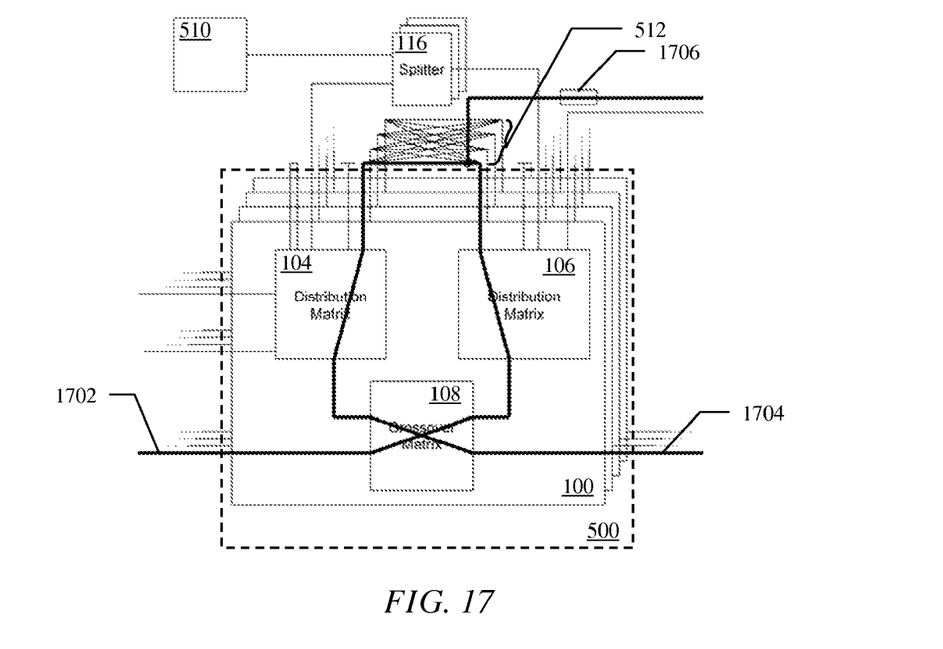
FIG. 17 is a block diagram illustrating operation of an apparatus for switching-in and switching-off telecommunications or data services in a telecommunications or data network in accordance with one embodiment of the present invention.

In embodiment illustrated in FIG. 17 it is possible to monitor the subscriber line 1702 by switching it via the crossover matrix 108, the second distribution matrix 106 and directly 512 to the first distribution matrix 104. The first distribution matrix 104 switches the subscriber line to the crossover matrix 108 and to the main cable line 1704. The monitoring is carried out by means of high impedance monitoring device 1706 connected to one of the plurality of direct connections 512 between the first 104 and second 106 distribution matrices. By having one of the plurality of direct connections 512 dedicated for monitoring it is possible to remotely switch any of the subscriber lines connected to the crossover matrix 108 to the dedicated monitored connection.

Figure 8:
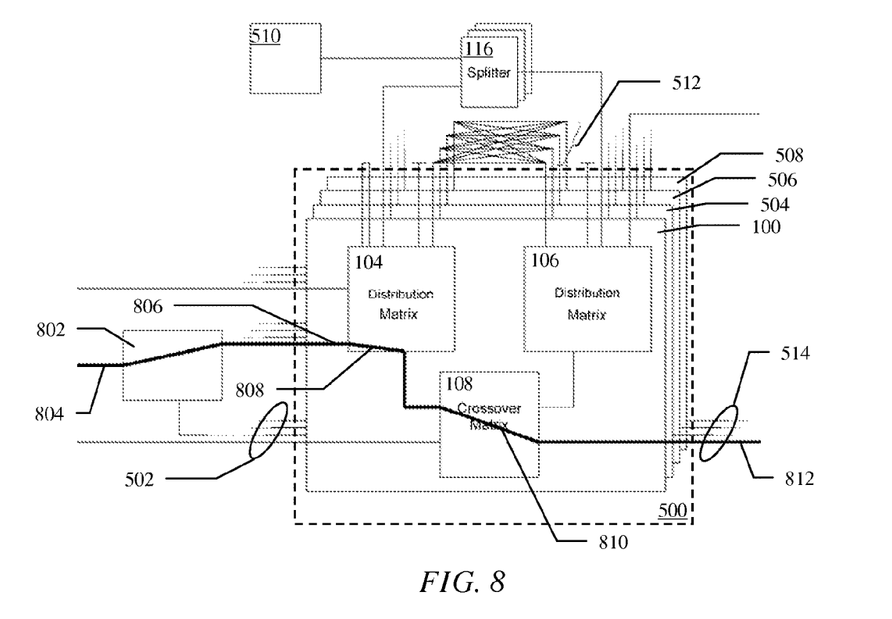
FIG. 8 is a block diagram illustrating operation of an apparatus for switching-in and switching-off telecommunications or data services in a telecommunications or data network in accordance with one embodiment of the present invention.

Referring to FIG. 8 adding a new subscriber line is illustrated. A new subscriber line 804 is connected from a concentrator 802 of unused subscriber lines to one of side ports of the first distribution matrix 104. The side ports of the distribution matrix are the outputs of the distribution matrix 104 but for the clarity illustrated at the side of the matrix. The outputs of the distribution matrix 104 designated as the side ports in this embodiment are the less worthy ones (i.e. outputs 33-64), but using other outputs (i.e. 1-32) is also possible. The concentrator matrix 104 switches 808 the new subscriber line to the crossover matrix 108 and the crossover matrix 108 further switches 810 the connection to a line 812 in the main cable.

Figure 12:
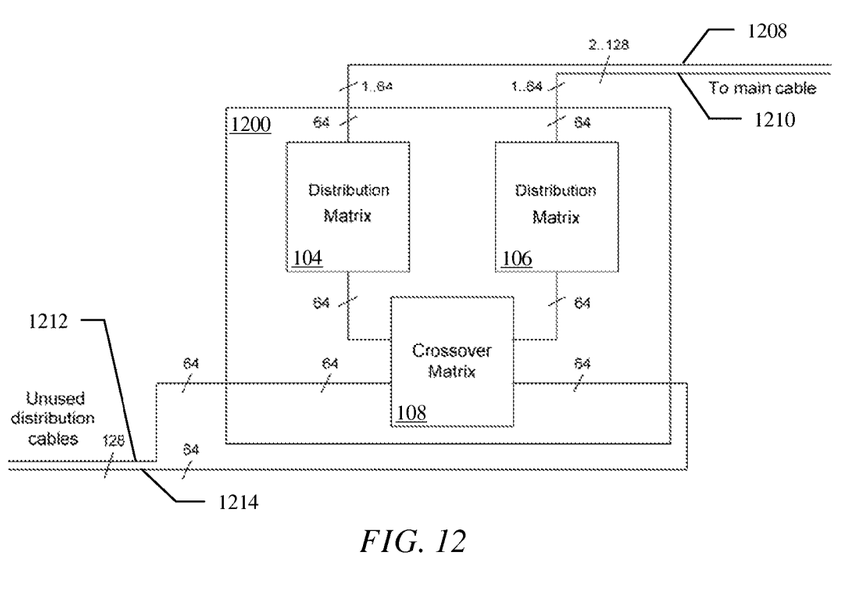
FIG. 12 is a block diagram illustrating operation of a concentrator device in accordance with one embodiment of the present invention.
Figure 13:
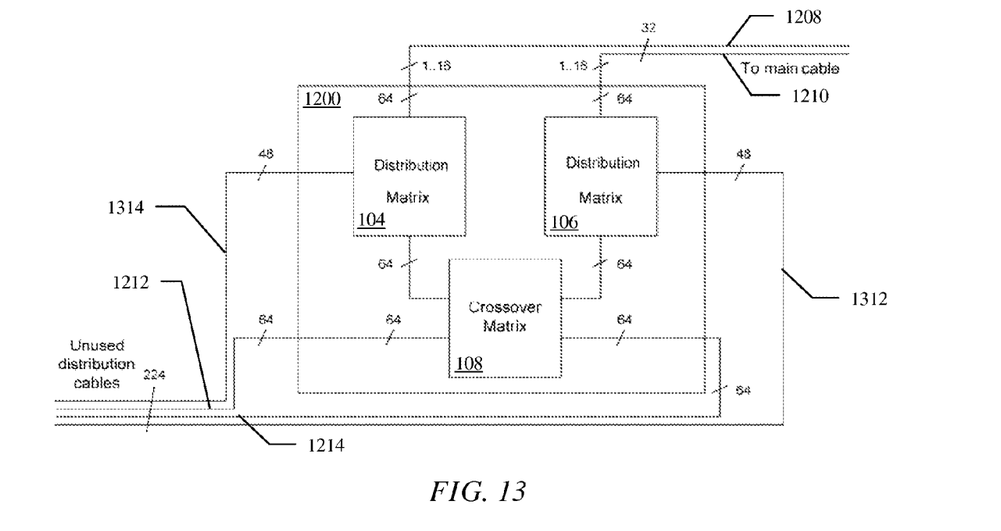
FIG. 13 is a block diagram illustrating operation of a concentrator device in accordance with one embodiment of the present invention.

In alternative embodiments it is of course possible to use other types of concentrator devices, but with a much higher number of relays or with very specific arrangement that allows using it only for that purpose. This is a big advantage of the invention that it can be used for different purposes, like in this example a different use of the inputs and outputs. More specific details of using of the apparatus 100 as concentrator of unused subscriber lines is shown in FIG. 12 and FIG. 13 and described below.

Figure 9:
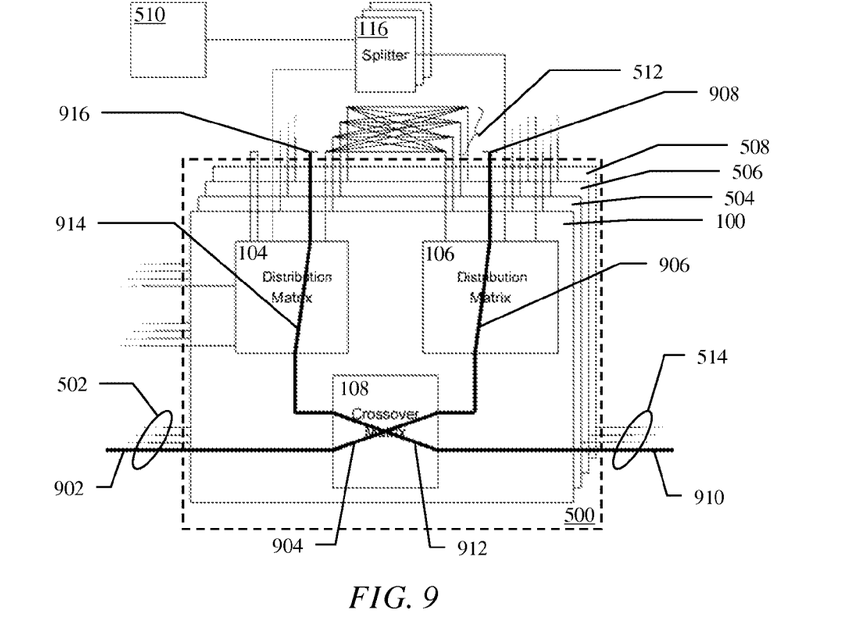
FIG. 9 is a block diagram illustrating operation of an apparatus for switching-in and switching-off telecommunications or data services in a telecommunications or data network in accordance with one embodiment of the present invention.

With reference to FIG. 9 disconnection of a subscriber is shown. If disconnection of service is requested the crossover switching element associated with the subscriber line 902 and corresponding line 910 in the main cable switches from passthrough to crossover 904 and 912, the first distribution matrix 104 switches 914 the subscriber line 902 from the output associated with the present service to an unconnected output 916 and the second distribution matrix 106 switches 906 the line 910 of the main cable associated with the subscriber line 902 from the output associated with the present service to an unconnected output 908.

Figure 10:
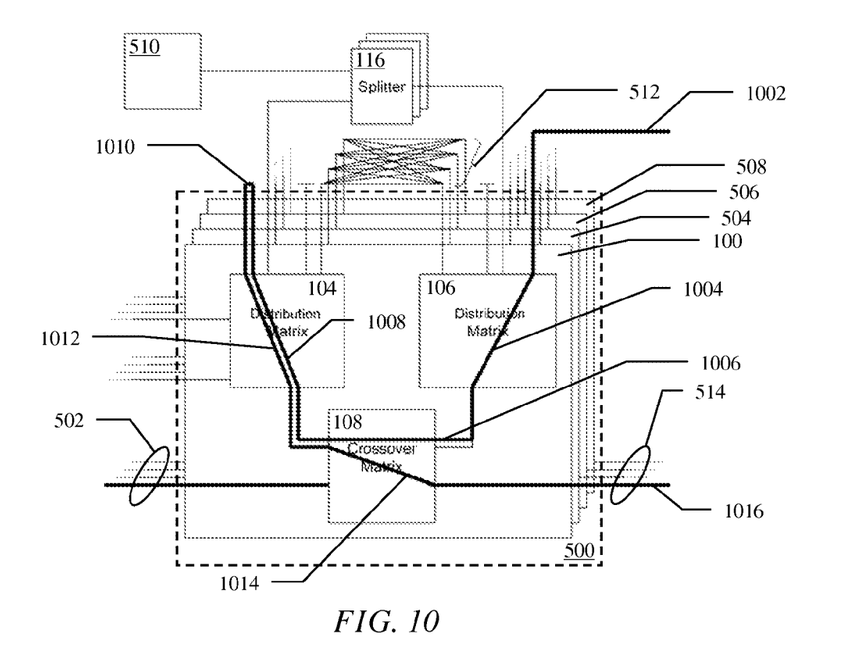
FIG. 10 is a block diagram illustrating operation of an apparatus for switching-in and switching-off telecommunications or data services in a telecommunications or data network in accordance with one embodiment of the present invention.

FIG. 10 illustrates testing of a main cable line connection 1016. The testing of the main cable line connection 1016 is carried out by setting a first crossover switching element of the crossover matrix 108, the first crossover switching element being associated with the tested line 1016, in a crossover position and switching a connection 1002 from a test head (not shown) through 1004 the second distribution matrix 106 and through 1006 a second crossover switching element of the crossover matrix 108 to 1008 the first distribution matrix 104. The connection is further switched via a closed loop 1010 in said first distribution matrix 104 to 1012 said first crossover switching element in the crossover matrix 108 associated with the tested line 1016, which, in turn, connects the test head to the tested line 1016 in the main cable.

Figure 11:
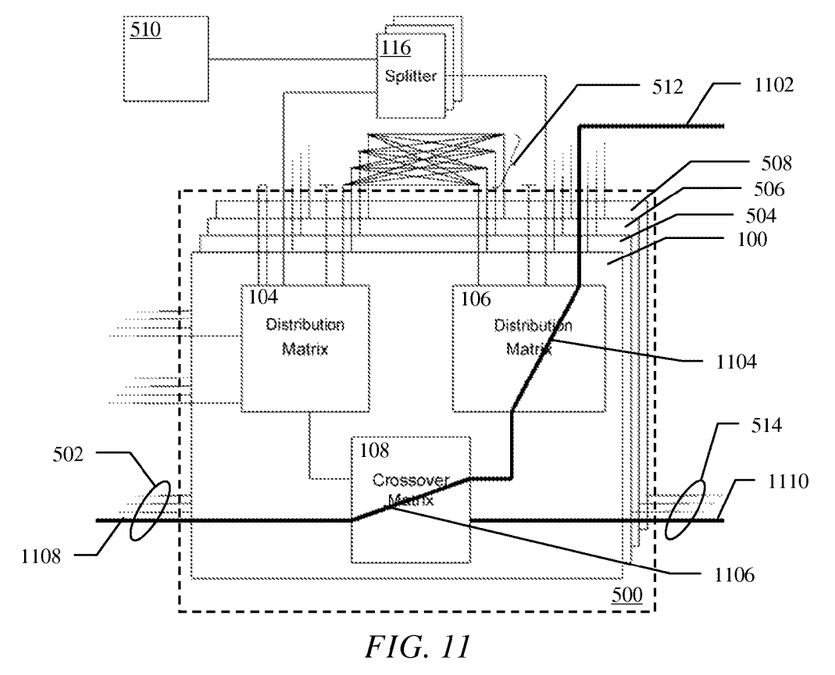
FIG. 11 is a block diagram illustrating operation of an apparatus for switching-in and switching-off telecommunications or data services in a telecommunications or data network in accordance with one embodiment of the present invention.

FIG. 11 illustrates testing of a subscriber line connection 1108. The testing of the subscriber line connection 1108 is carried out by disconnecting port B for connection to the main cable in a crossover switching element associated with the tested subscriber line 1108 and connecting ports C and D for connection to the distribution matrices 104, 106 with port A of said crossover switching element for connection to the subscriber line 1108. A connection 1102 from a test head (not shown) is switched through 1104 the second distribution matrix 106 to 1106 said crossover switching element associated with said subscriber line 1108 in said crossover matrix 108.

With reference to FIG. 12 a device 1200 for concentration of unused subscriber lines in a telecommunications network is illustrated. The device 1200 comprises a first distribution matrix 104 connected to a crossover matrix 108 and a second distribution matrix 106 connected to said crossover matrix 108. The crossover matrix 108 is adapted to be connected to a distribution cable 1212, 1214 and crossover switching elements for switching of connections within said crossover matrix 108 and distribution switching elements for switching of connections within said distribution matrices 104, 106 are controlled from a remote location. The first distribution matrix 104 and the second distribution matrix 106 are adapted to be connected to a main cable and to a node for providing a plurality of telecommunications or data services 1208, 1210. However, it is also possible that the distribution matrices 104, 106 are connected only to the main cable.

In alternative embodiment illustrated in FIG. 13 the device 1200 has part of outputs 1314 of the first distribution matrix 104 and part of outputs 1312 of the second distribution matrix 106 connected to the distribution cable. The outputs 1314 and 1312 are illustrated as side ports of the distribution matrices 104 and 106 and the side ports are explained above in relation to FIG. 8.

The concentrator device 1200 as illustrated in FIG. 12 allows for solving the problem of connecting a big number of subscriber lines to a main cable. Normally the number of lines in the subscriber cable 1212, 1214 (e.g. 500) is significantly higher than in the main cable 1208, 1210 (e.g. 300), which means that it is not possible to connect every line in the subscriber cable 1212, 1214 to a line in the main cable 1208, 1210. Furthermore there are unused lines in said distribution cable due to the fact that every customer premise is connected with 8 to 12 wires, but often a smaller number of them are used (minimum 2). The other, unused lines, are spare for additional lines or replacements for broken ones. The concentrator device 1200 allows for easy connection and change of connections between lines in subscriber cable and lines in the main cable depending on requirements. In the particular example illustrated in FIG. 12 it is possible to connect 128 subscriber lines to the concentrator device 1200 and switch their connections to 128 output ports connected to the main cable.

The concentrator device 1200 as illustrated in FIG. 13 is an alternative embodiment of the device shown on FIG. 12. In this embodiment the number of connections (ports) available for connecting the lines from the subscriber cable 1212, 1214 is increased by using for that purpose also part of the output ports 1314, 1312 of the distribution matrices 104, 106. In the example illustrated in FIG. 13 it is possible to connect 224 subscriber lines and switch appropriate part of them to 32 lines in the main cable, which means that the "appropriate part" is 32 subscriber lines.

With reference to FIG. 1 an alternative method of operating a telecommunications network is presented. In the network services are provided from a node for supplying a plurality of telecommunications services (e.g. MSAN 114) to a plurality of users (subscribers), wherein a plurality of subscriber lines are connected to the network through a crossover matrix 108. A subscriber line connected to a first crossover switching element of the crossover matrix 118 is switched to a second distribution matrix 106. The second distribution matrix 106 switches the subscriber line through a series of distribution switching elements to an output port directly 118 connected with the first distribution matrix 104 (i.e. the connection does not go via the splitter 116). The first distribution matrix 104 switches the subscriber line to a second crossover switching element of the crossover matrix 108 which, in turn, switches the subscriber line again to the second distribution matrix 106. The second distribution matrix 106 switches the subscriber line through series of distribution switching elements to an output connected to said node for supplying services 114.

The reason for this type of recursive switching of the subscriber line is that if the output port for connecting to the MSAN cannot be reached from the input of the second distribution matrix 106 to which the subscriber line is connected (in the example of the distribution matrix with 64 input/output ports output port only output ports 1-16 can be reached from all input ports) this requested output port can be reached in the second loop when the subscriber line is connect to another input port.

Alternatively, the subscriber line is looped through the crossover matrix 108, the second distribution matrix 106, the first distribution matrix 106 more than once before it is connected to the output connected to the MSAN 114.

Figure 14A:
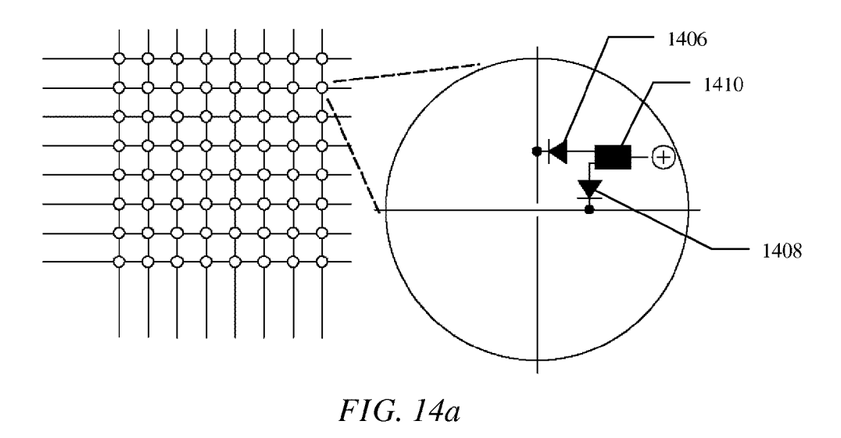
FIG. 14a-c is a diagram illustrating arrangement of relay elements in an X-Y matrix in accordance with one embodiment of the present invention.
Figure 14B:
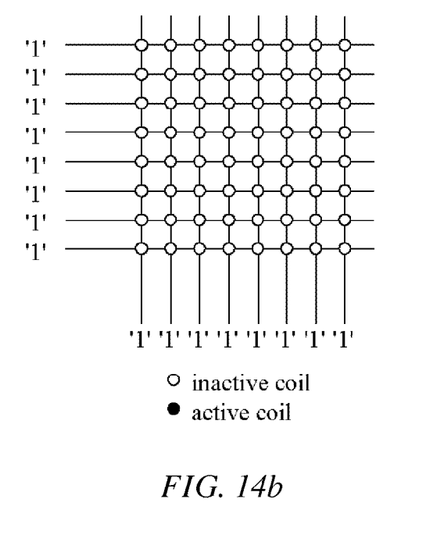
Figure 14C:
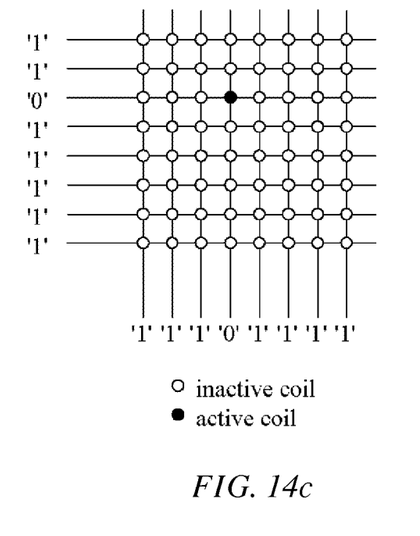

With reference to FIG. 14 it is shown how the relays of the switching elements 202 and 302 are controlled. The control of said relays is optimised in a way that it is not necessary to control n relays independently by n controllers but only by 2-times square root of n controllers. In effect e.g. 64 relays don't need 64 controllers but only 2×8=16 controllers. The fact that not all relays can be toggled together is not a problem because switching all relays at the same time could destroy the device due to very high power consumption. In consequence it would require power supply resources, which would be most of the time unused. The shown diodes 1406, 1408 and the coil 1410 (for simplicity additional components have been left out) represent a logical gate (NOR function) in a way that there is only current through the coil 1410 if both diodes 1406, 1408 have low potential. Operation and implementation in practice of the arrangement of FIG. 14 *a-c* is clear for one skilled in the art.

The present invention allows for flexible switching-in and switching off services to subscribers in a telecommunications or data network from a remote location and by reducing probability of blocking the necessity of manual reconfiguration by field engineer is also reduced.

The functionality defined in the present invention may be implemented in a plurality of units or as part of other functional units. In consequence, the invention may be physically and functionally distributed between different units. Furthermore, although individually listed, a plurality of means, elements or method steps may be implemented by e.g. a single unit. Singular references do not exclude a plurality. Thus references to "a", "an", "first", "second" etc do not preclude a plurality.

The invention claimed is:

1. A device for switching-in and switching-off telecommunications or data services in a telecommunications or data network to a plurality of subscribers, the device comprising:
    a plurality of switching devices, each switching device comprising:
        a crossover matrix comprising crossover switching elements configured to switch connections within the crossover matrix, the crossover matrix connected to a main cable and a distribution cable;
        a first distribution matrix comprising distribution switching elements configured to switch connections within the first distribution matrix, the first distribution matrix connected to the crossover matrix;
        a second distribution matrix comprising distribution switching elements configured to switch connections within the second distribution matrix, the second distribution matrix connected to the crossover matrix;
        wherein the crossover switching elements and distribution switching elements are configured to be controlled from a remote location;
        wherein the first and second distribution matrices are configured to connect to a node that provides a plurality of telecommunications or data services; and
        wherein the first distribution matrix from a first switching device is connected to at least one second distribution matrix of the plurality of switching devices.

2. The device of claim 1 wherein the first distribution matrix comprises a plurality of output ports, each of which is connected to two or more second distribution matrices of the plurality of switching devices.

3. The device of claim 1 wherein the first distribution matrix and the second distribution matrix are directly connected.

4. The device of claim 1 wherein the crossover matrix comprises a plurality of 2×2 crossover switching elements, and is configured to connect a subscriber directly to the main cable or to one of the first and second distribution matrices.

5. The device of claim 4 wherein one of the 2×2 crossover switching elements associated with one subscriber line comprise independently controlled relays.

6. The device of claim 1 wherein the first and second distribution matrices comprise a plurality of 2×2 distribution switching elements, and wherein the matrices are configured to connect a subscriber line switched from the crossover matrix to the node, and to connect the subscriber line from the node to the crossover matrix.

7. The device of claim 6 wherein the matrices are further configured to connect subscriber lines directly from the first distribution matrix to the second distribution matrix.

8. The device of claim 6 wherein the 2×2 distribution switching elements of the first and second distribution matrices comprise commonly controlled switches.

9. The device of claim 1 wherein the first and second distribution matrices are further configured to be connected to the node via a splitter.

10. A telecommunications or data network including a node for providing a plurality of telecommunications or data services to a plurality of subscribers, the network comprising:
    a device configured to switch-in and switch-off telecommunications to a plurality of subscribers, the device comprising:
        a plurality of switching devices, each switching device comprising:

a crossover matrix comprising crossover switching elements configured to switch connections within the crossover matrix, the crossover matrix connected to a main cable and a distribution cable;

a first distribution matrix comprising distribution switching elements configured to switch connections within the first distribution matrix, the first distribution matrix connected to the crossover matrix;

a second distribution matrix comprising distribution switching elements configured to switch connections within the second distribution matrix, the second distribution matrix connected to the crossover matrix;

wherein the crossover switching elements and distribution switching elements are configured to be controlled from a remote location;

wherein the first and second distribution matrices are configured to connect to a node that provides a plurality of telecommunications or data services; and wherein the first distribution matrix from a first switching device is connected to at least one second distribution matrix of the plurality of switching devices.

11. The network of claim 10 wherein the first distribution matrix and the second distribution matrix are directly connected.

12. The network of claim 10 wherein the crossover matrix comprises a plurality of 2×2 crossover switching elements, and is configured to connect a subscriber directly to one of the main cable and to one of the distribution matrices.

13. The network of claim 12 wherein the 2×2 crossover switching element associated with one subscriber line comprises independently controlled relays.

14. The network of claim 10 wherein the first and second distribution matrices comprise a plurality of 2×2 distribution switching elements, and are configured to connect a subscriber line switched from the crossover matrix to the node, and to connect the subscriber line from the node to the crossover matrix.

15. The network of claim 14 wherein the first and second distribution matrices are further configured to connect subscriber lines directly from the first distribution matrix to the second distribution matrix.

16. The network of claim 14 wherein the 2×2 distribution switching elements of the distribution matrices comprise commonly controlled switches.

17. The network of claim 10 further comprising a splitter configured to connect the first and second distribution matrices to the node.

18. The network of claim 10 wherein the node that provides the plurality of telecommunications or data services comprises a Multi-Service Access Node (MSAN).

19. A method of operating a telecommunications or data network in which a node provides a plurality of telecommunications or data services to a plurality of subscribers, the method comprising:

connecting a plurality of subscriber lines to the network by a crossover matrix having a plurality of crossover switching elements;

receiving a request to add or modify a service to a subscriber line;

remotely controlling a crossover switching element associated with the subscriber line to electrically switch the subscriber line on a subscriber cable side of the crossover matrix to a second distribution matrix, and to electrically switch a main cable side of the crossover matrix to a first distribution matrix; and remotely controlling distribution switching elements disposed in the first and second distribution matrices to switch the subscriber line to the outputs of the first and second distribution matrices.

20. The method of claim 19 further comprising connecting the outputs of the first and second distribution matrices that are associated with the requested services to the node that provides the requested service to the subscriber line.

21. The method of claim 19 further comprising:
receiving a request for a change of service; and
switching the subscriber line at the first and second distribution matrices from an output associated with a current service to an output associated with the requested service in response to the request.

22. The method of claim 19 further comprising
receiving a request to disconnect a current service; and
switching the subscriber line at the first and second distribution matrices from an output associated with the current service to an unconnected output in response to the request.

23. The method of claim 19 further comprising testing a subscriber line connection by:
in a crossover switching element associated with the tested subscriber line:
disconnecting a first port connected to the main cable; and
connecting a second port and a third port with a fourth port, wherein the second and third ports connect to the first and second distribution matrices, respectively, and the fourth port connects to the subscriber line being tested; and
switching a test head connection through the second distribution matrix to the crossover switching element associated with the tested subscriber line.

24. The method of claim 19 further comprising testing a main cable line connection by:
setting a first crossover switching element associated with the tested line in a crossover position; and
switching a test head connection through, in the following order:
the second distribution matrix;
a second crossover switching element of the crossover matrix;
the first distribution matrix; and
a closed loop in the first distribution matrix;
to the first crossover switching element;
whereby the test head connection is connected to the tested line in the main cable.

25. The method of claim 19 further comprising:
connecting a new subscriber line from a concentrator of unused subscriber lines to one of the outputs of the first distribution matrix;
switching the new subscriber line connection from the first distribution matrix to the crossover matrix; and
switching the new subscriber line connection at the crossover matrix to connect the new subscriber line to a line in the main cable.

26. The method of claim 19 further comprising:
switching the subscriber line through the second distribution matrix to an output connected to the node via a splitter; and
providing the requested service to the subscriber line from the node;
wherein the subscriber line is connected at the splitter to a line from the main cable.

27. The method of claim 19 wherein the crossover matrix, the first distribution matrix and the second distribution matrix, comprise a single switching device.

28. The method of claim 27 further comprising interconnecting a plurality of switching devices such that a first distribution matrix from a first switching device connects to at least one second distribution matrix of the plurality of switching devices.

29. The method of claim 28 further comprising, responsive to a request for a subscriber line change:
configuring a first crossover switching element to switch the subscriber line to the second distribution matrix;
configuring the second distribution matrix to switch the subscriber line directly to a first distribution matrix; and
configuring the first distribution matrix to switch the subscriber line to a second crossover switching element that connects the subscriber line to another line in the main cable.

30. The method of claim 29 wherein the first crossover switching element and the second distribution matrix form a part of a first switching device, and wherein the second crossover switching element and the first distribution matrix form a part of a second switching device.

31. The method of claim 29 wherein the first crossover switching element, the second distribution matrix, the second crossover switching element and the first distribution matrix form a part of the same switching device.

32. A method of operating a telecommunications or data network having a node that provides a plurality of telecommunications or data services to a plurality of users, and wherein a plurality of subscriber lines connect to the network through a crossover matrix, the method comprising:
switching a subscriber line connected to a first crossover switching element of the crossover matrix to a second distribution matrix;
switching the subscriber line at the second distribution matrix to an output port directly connected to the first distribution matrix;
switching the subscriber line at the first distribution matrix to a second crossover switching element of the crossover matrix;
switching the subscriber line at a second crossover switching element of the crossover matrix to the second distribution matrix;
switching the subscriber line at the second distribution matrix to an output connected to the node that provides the requested services.

33. The method of claim 32 further comprising configuring the first and second distribution matrices and the crossover matrix such that the subscriber line loops through the distribution matrices and the crossover matrix at least twice before it is connected to the output connected to the node.

* * * * *